US012674347B2

(12) United States Patent
Pawar

(10) Patent No.: US 12,674,347 B2
(45) Date of Patent: Jul. 7, 2026

(54) BRAKING SYSTEM FOR VEHICLE DOORS

(71) Applicant: Honda Motor Co., Ltd., Tokyo (JP)

(72) Inventor: Tushar Jagannath Pawar, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/790,113

(22) Filed: Jul. 31, 2024

(65) Prior Publication Data

US 2026/0035976 A1 Feb. 5, 2026

(51) Int. Cl.
*E05F 5/02* (2006.01)

(52) U.S. Cl.
CPC ......... *E05F 5/025* (2013.01); *E05Y 2201/246* (2013.01); *E05Y 2201/488* (2013.01); *E05Y 2900/531* (2013.01)

(58) Field of Classification Search
CPC .... E05F 5/025; E05F 15/40; E05Y 2201/246; E05Y 2201/488; E05Y 2900/531; E05C 17/003; E05C 17/006; E05C 17/22; E05C 17/26; E05C 17/28; E05C 17/203; E05C 17/206; F16D 49/16; F16D 2055/0016
See application file for complete search history.

(56) References Cited

U.S. PATENT DOCUMENTS 5,474,344 A * 12/1995 Lee ....................... E05C 17/203 292/265
6,446,305 B1 * 9/2002 Kneeland .............. E05C 17/206 16/72
6,728,993 B1 * 5/2004 Murayama .............. F16C 17/02 16/342
6,842,943 B2 * 1/2005 Hoffmann ............. E05C 17/203 16/50
6,901,630 B2 * 6/2005 Liang .................... E05C 17/203 16/86 B
7,076,833 B2 * 7/2006 Murayama ........... E05C 17/203 16/82
7,280,035 B2 10/2007 McLain et al.
7,516,514 B2 4/2009 Rieder
7,530,141 B2 * 5/2009 Heinrichs ............. E05C 17/203 16/86 C
7,586,402 B2 9/2009 Bihler et al.

(Continued)

FOREIGN PATENT DOCUMENTS

AT 412898 B * 8/2005 ............ E05F 15/652
CN 108138526 B * 5/2020 ........... E05C 17/203

(Continued)

*Primary Examiner* — William L Miller
(74) *Attorney, Agent, or Firm* — Plumsea Law Group, LLC

(57) ABSTRACT

A braking system for a vehicle door including a first lever having a first end, a second end, and a central pivot point between the first end and the second end. The second end of the first lever includes a first brake pad configured to engage with a retainer arm associated with a door of a vehicle. In addition, the system includes a second lever having a first end, a second end, and a central pivot point, wherein the second end of the second lever includes a second brake pad configured to engage with the retainer arm. Further, the system includes an actuation device configured to move a first end of the first lever in a first direction to thereby move the first brake pad and the second brake pad into engagement with the retainer arm.

18 Claims, 9 Drawing Sheets

(56) References Cited

U.S. PATENT DOCUMENTS 7,640,627 B2 * 1/2010 Lowen .................. E05C 17/203 16/334
8,414,062 B2 * 4/2013 Gobart ................ E05D 11/1028 296/146.4
8,869,350 B2 * 10/2014 Gruber ................ E05B 15/1635 16/85
9,598,890 B1 * 3/2017 Hooton ..................... E05F 5/06
9,777,519 B1 * 10/2017 Nam ..................... E05C 17/203
9,850,695 B2 12/2017 Torres Fernandez et al.
10,260,260 B2 * 4/2019 Youn ..................... E05C 17/203
10,344,516 B2 7/2019 Sauerwein et al.
10,738,524 B2 8/2020 Gomez Melchor et al.
10,968,667 B2 4/2021 Nottebaum et al.
10,968,668 B2 * 4/2021 Gruber .................. E05C 17/203
11,220,854 B2 1/2022 Podkopayev
11,492,828 B2 * 11/2022 Hoffmann ............. E05C 17/446
11,643,858 B2 * 5/2023 Rossi .................... E05C 17/203 16/82
11,808,067 B2 * 11/2023 Hoffmann ............... E05C 17/16
2003/0037411 A1 * 2/2003 Seo ....................... E05C 17/206 16/86 C
2003/0051312 A1 * 3/2003 Hoffmann ............. E05C 17/203 16/50
2003/0163895 A1 * 9/2003 Liang .................... E05C 17/203 16/82
2004/0075285 A1 * 4/2004 Murayama ............ E05C 17/203 292/265
2004/0111832 A1 * 6/2004 Murayama ............ E05C 17/203 16/82
2006/0150367 A1 * 7/2006 Matsuki ................ E05C 17/206 16/86 C
2006/0207058 A1 * 9/2006 Heinrichs ............. E05C 17/203 16/86 B
2007/0012687 A1 * 1/2007 Lowen .................. E05C 17/203 219/724
2008/0066260 A1 * 3/2008 Clark .................... E05C 17/203 16/86 A
2009/0033477 A1 2/2009 Illium et al.
2009/0106934 A1 * 4/2009 Chang ................... E05C 17/203 16/84
2010/0154163 A1 * 6/2010 Hoffmann ............. E05C 17/203 16/85
2012/0233813 A1 * 9/2012 Settsu ....................... E05F 5/00 16/82
2012/0246871 A1 * 10/2012 Settsu ................... E05C 17/203 16/83
2016/0010379 A1 * 1/2016 Sauerwein ................ E05F 5/00 49/350
2017/0138099 A1 * 5/2017 Wittorf .................. B60J 5/0468
2017/0260792 A1 * 9/2017 Torres Fernandez ... E05F 5/025
2017/0350175 A1 * 12/2017 Hoffmann ............. E05C 17/203
2018/0010372 A1 * 1/2018 Rucha ..................... E05C 17/22
2019/0010741 A1 * 1/2019 Youn ..................... E05C 17/206
2019/0106917 A1 * 4/2019 Patterson .............. E05C 17/206
2019/0112849 A1 4/2019 Cumbo
2019/0376327 A1 * 12/2019 Hertel ................. E05B 15/1635
2021/0131141 A1 * 5/2021 Rossi .................... E05C 17/203
2021/0164276 A1 * 6/2021 Hoffmann ............. E05C 17/163
2022/0186540 A1 * 6/2022 Cappelli ................... E05F 5/00
2025/0012331 A1 * 1/2025 Gutierrez-Fernandez ................... F16D 49/16
2025/0116145 A1 * 4/2025 Kim ........................ E05F 5/025
2025/0223856 A1 * 7/2025 Zhurba ................... E05F 5/025

FOREIGN PATENT DOCUMENTS

DE 102016010117 A1 * 2/2018 ........... E05C 17/203
EP 2666945 A1 11/2013
FR 2898631 B1 8/2010
KR 100776659 B1 11/2007
KR 100923346 B1 10/2009
KR 100970167 B1 7/2010
KR 101718805 B1 3/2017
KR 20250062591 A * 5/2025 ............ B60J 5/0493
WO WO-2004013441 A1 * 2/2004 ............ E05F 15/655
WO 2008100233 A2 8/2008

* cited by examiner

BRAKING SYSTEM FOR VEHICLE DOORS

BACKGROUND

1. Field of the Disclosure

The present disclosure relates to a braking system for vehicle doors and, more particularly, to a braking system including actuatable levers configured to bind a door retainer arm.

2. Description of Related Art

In some situations, vehicle doors can be opened too quickly, resulting in damage to the vehicle and/or to adjacent vehicles or other objects. Sometimes a vehicle door can be opened too quickly, for example due to wind, parking on an incline, simple user error, and/or other factors. If a door opens too quickly it can bump into an adjacent vehicle or other object, like a shopping cart. This can damage the other vehicle and/or the vehicle whose door opened too quickly. In addition, even if there is not an obstacle in the way, if a door opens too quickly, it can damage the hinges of the door when the door reaches its maximum opening angle.

In addition, in some situations, vehicle doors can be closed too quickly, resulting in damage to the door latch mechanism or collision with any objects that are not clear of the doorway. Again, this can be the result of wind, parking on an incline, simple user error, and/or other factors.

There is a need in the art for a braking system for vehicle doors that addresses one or more of the issues noted above.

SUMMARY OF THE INVENTION

The present disclosure directed to a braking system for vehicle doors. The system includes a caliper-type braking system. This caliper system includes two levers that are simultaneously actuated by a solenoid under certain conditions. The system monitors the opening and closing of the doors and determines whether the door acceleration and/or velocity (angular or linear) is too high. If the acceleration and/or velocity is above a predetermined threshold, the system activates the solenoid, which actuates a solenoid actuator rod. The actuator rod is connected to a first lever, which is connected via a linkage to a second lever. The levers are rotated in opposite directions to bring brake pads at the distal ends of the levers into contact with a door retainer arm (aka checker arm). As the door opens or closes, the checker arm moves between the brake pads. Thus, by applying pressure to the door retainer arm with the brake pads, the braking system can slow down, stop, and hold the door in position.

The disclosed braking system may be implemented on any type of door on any type of vehicle. For example, the disclosed braking system may be implemented on land vehicles, boats, aircraft alike. In addition, considering the context of land vehicles, the disclosed braking system may be applicable to traditional forward-swinging side doors as well as rearward-swinging side doors. In other embodiments, the disclosed braking system may be applicable to rear hatches (i.e., for hatchback models), front hoods/trunk lids, and/or rear trunk lids.

In one aspect, the present disclosure is directed to a braking system for a vehicle door. The system includes a first lever having a first end, a second end, and a central pivot point between the first end and the second end. The second end of the first lever includes a first brake pad configured to engage with a retainer arm associated with a door of a vehicle. In addition, the system includes a second lever having a first end, a second end, and a central pivot point, wherein the second end of the second lever includes a second brake pad configured to engage with the retainer arm. Further, the system includes an actuation device configured to move a first end of the first lever in a first direction to thereby move the first brake pad and the second brake pad into engagement with the retainer arm.

In another aspect, the present disclosure is directed to a vehicle including a braking system for a door of the vehicle. The vehicle includes a vehicle body and at least one door opening associated with a vehicle door. The vehicle also includes a door braking system including: a retainer arm connecting the vehicle door with the vehicle body; a first lever including a first brake pad configured to engage with the retainer arm; a second lever including a second brake pad configured to engage with the retainer arm; a linkage between the first lever and the second lever such that movement of the first lever also moves the second lever; and an actuation device configured to actuate the first lever to thereby move the first brake pad and the second brake pad into engagement with the retainer arm.

In another aspect, the present disclosure is directed to a braking system for a door of a vehicle. The system includes a first lever including a first brake pad configured to engage with the retainer arm associated with a door of a vehicle; a second lever including a second brake pad configured to engage with the retainer arm; an actuation device configured to actuate the first lever to thereby move the first brake pad and the second brake pad into engagement with the retainer arm; and a controller including a device processor and a non-transitory computer readable medium having instructions stored thereon and executable by the processor to perform the following steps: receiving data regarding movement of a vehicle door; determining, based on the received data whether the acceleration or velocity of the vehicle door exceeds a predetermined value; and activating the actuation device in order to apply the braking system to the retainer arm to thereby control movement of the vehicle door.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to some aspects, the present disclosure is directed to a braking system for vehicle doors. The system includes a caliper-type braking system including two levers that are simultaneously actuated by a solenoid under certain conditions, namely excessive door acceleration and/or velocity.

Figure 1:
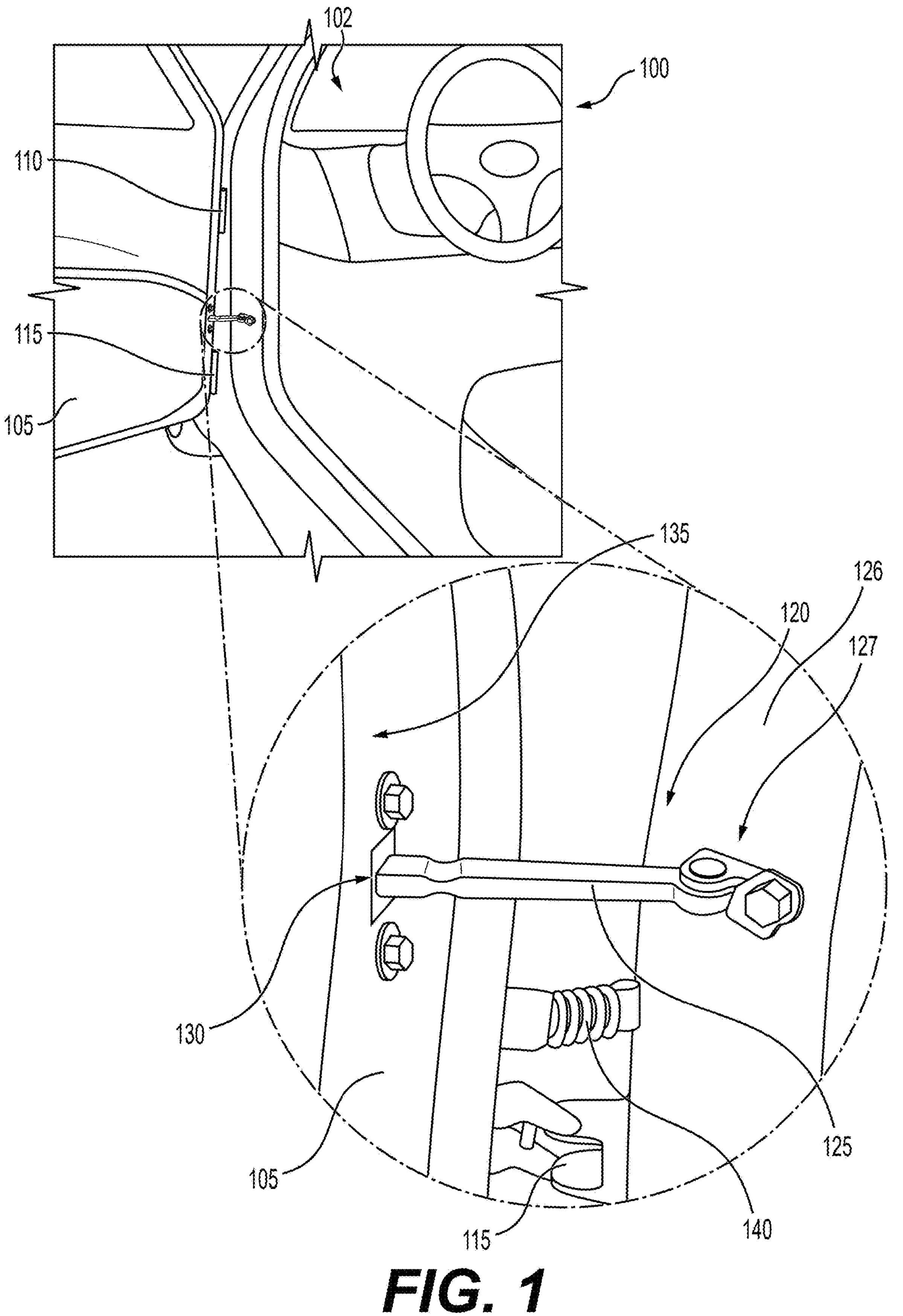
FIG. 1 is a schematic perspective rear view of an open vehicle door with an enlarged view of a door retainer arm.

FIG. 1 is a schematic perspective rear view of an open vehicle door with an enlarged view of a door retainer arm. FIG. 1 illustrates the contextual mechanism with which the disclosed braking system works. That is, FIG. 1 shows the structures that extend between the door and the body of the vehicle. The mechanical components of the braking system may be disposed within the shell of the door, and thus, are not visible in the view illustrated in FIG. 1.

As shown in FIG. 1, a vehicle 100 may include a door opening 102 with which a door 105 is associated. Door 105 is pivotally attached to the vehicle body with an upper hinge 110 and a lower hinge 115. It will be understood that the vehicle may implement as many hinges as desired to support door 105.

As shown in the enlarged portion of FIG. 1, a door retainer mechanism 120 may include a door retainer arm 125 (also referred to as a checker arm). Door retainer arm 125 may be attached to the vehicle body, for example to an A pillar 126. As shown in FIG. 1, door retainer arm 125 is attached to A pillar 126 with a bolted bracket 127. It will be understood that door retainer arm 125 may be attached to the vehicle body in any suitable location, such as the A pillar, B pillar, C pillar, or other locations proximate door openings and associated with vehicle doors.

At an opposing end of door retainer arm 125 from bracket 127, door retainer arm 125 extends into a cavity within door 105 through an opening 130 in a front wall 135 of door 105. Finally, for additional context, a wire conduit 140 extending from the vehicle body to door 105 is shown, which may house wires for transmitting data and/or control signals from door 105 to a controller housed on board the body of vehicle 100.

Figure 2:
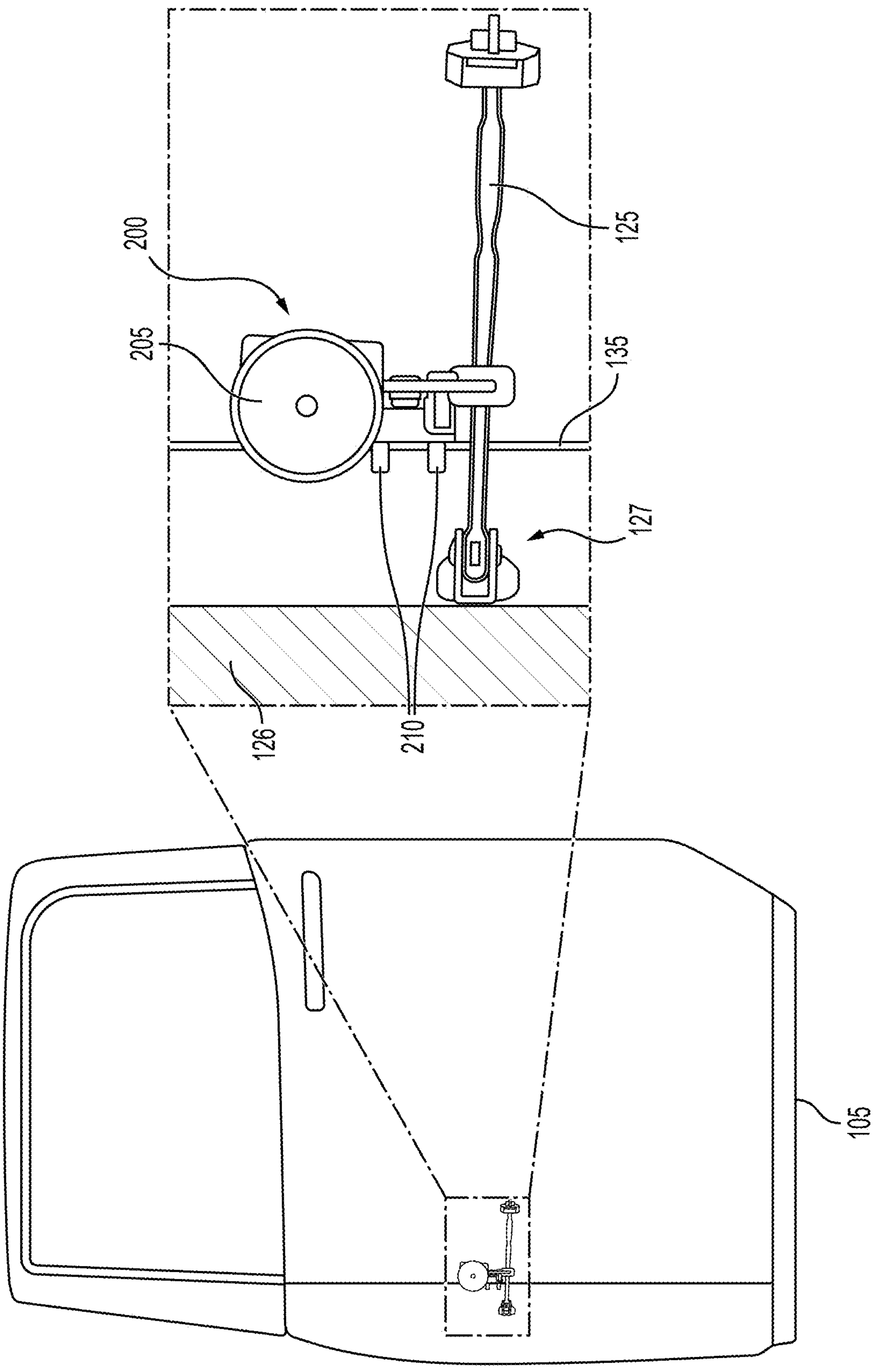
FIG. 2 is a schematic side view of a vehicle door with an enlarged view of a door braking system.

FIG. 2 is a schematic side view of a vehicle door with an enlarged view of a door braking system. As shown in FIG. 2, a door braking system may include a door braking assembly 200, which may be housed within a cavity in door 105. In this side view, a solenoid 205 of assembly 200 is clearly shown. The actuation of solenoid 205 is shown and discussed in more detail later in this disclosure, for example, with respect to FIGS. 3-6.

As shown in FIG. 2, assembly 200 may be attached to front wall 135 of door 105 with fasteners 210. The side view of FIG. 2 illustrates the positioning of the components of assembly 200 with door 105 in the closed position. Thus, FIG. 2 shows door retainer arm 125 almost completely received within the cavity within door 105.

Figure 3:
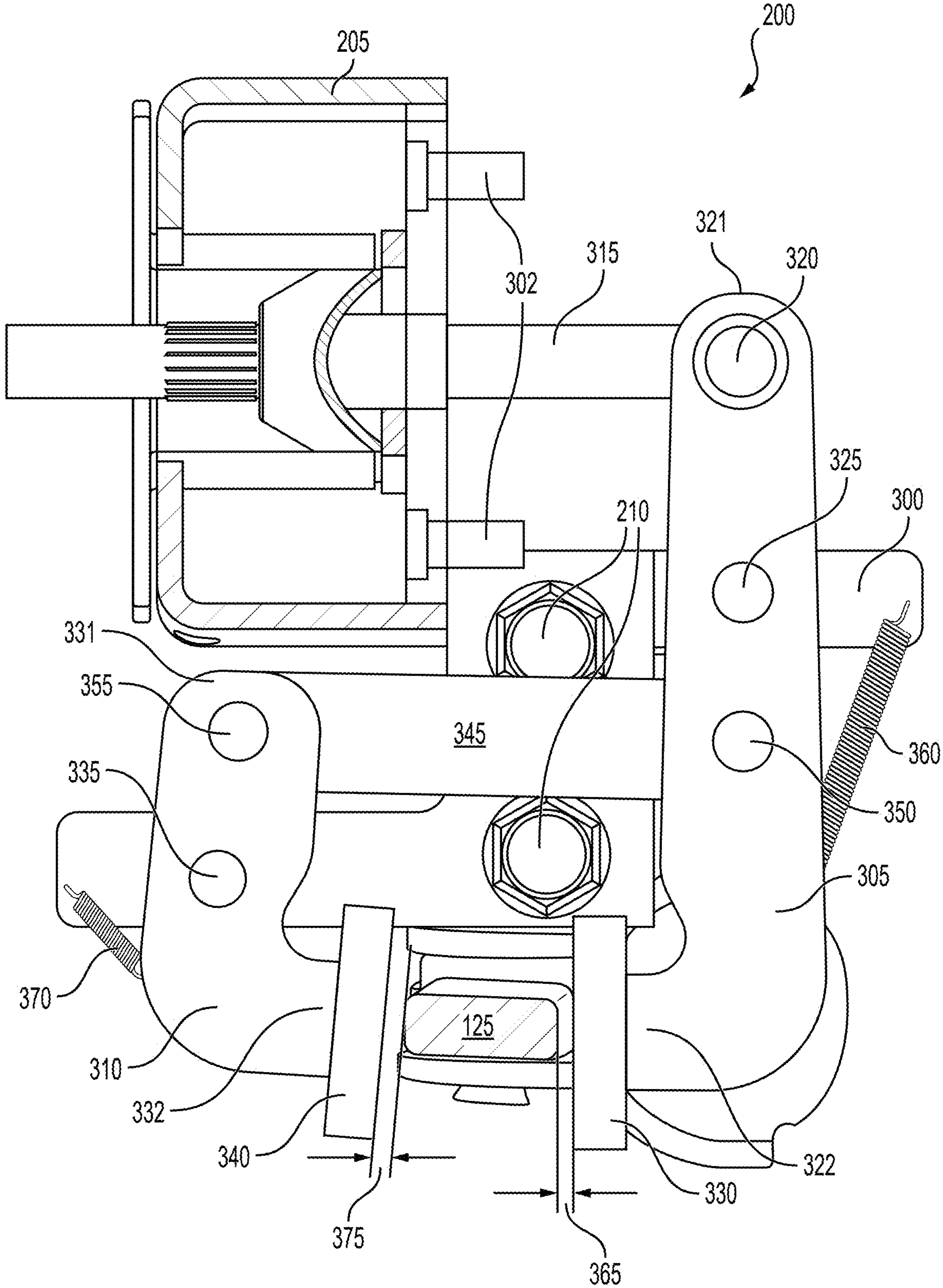
FIG. 3 is a schematic rear view of a door braking system in an open, inactive condition.

FIG. 3 is a schematic rear view of a door braking assembly in an open, inactive condition. As shown in FIG. 3, door braking assembly 200 may include an actuation device, such as solenoid 205. It will be understood that any suitable type of actuator may be utilized to drive the components of door braking assembly 200. In addition, assembly 200 includes a mounting bracket 300, which may be mounted to the front wall of the vehicle door with fasteners 210.

Various components of assembly 200 may be attached to mounting bracket 300. For example, solenoid 205 may be attached to mounting bracket 300 with fasteners 302. The attachment/relationship between solenoid 205 and mounting bracket 300 is shown in more detail in FIGS. 5 and 6.

In addition, assembly 200 includes a first lever 305 and a second lever 310. As shown in FIG. 3, first lever 305 is attached to a solenoid actuator rod 315 at a first pivot joint 320. First lever 305 has a first end 321, a second end 322, and a central pivot point between first end 321 and second end 322. In particular, first lever 305 is pivotally attached to mounting bracket 300 at a second pivot joint 325, which enables first lever 305 to rotate with respect to mounting bracket 300. Second end 322 of first lever 305 includes a first brake pad 330 configured to engage with retainer arm 125 associated with a door of a vehicle.

Second lever 310 may include a first end 331, a second end 332, and a central pivot point between first end 331 and second end 332. In particular, second lever 310 is pivotally attached to mounting bracket 300 at a third pivot point 335. In addition, second end 332 of second lever 310 includes a second brake pad 340 configured to engage with retainer arm 125.

Door braking assembly 200 also includes a linkage between the first lever and the second lever such that movement of the first lever also moves the second lever. For example, assembly 200 includes a cross member link 345 pivotally connected to first lever 305 at a fourth pivot point 350 and pivotally connected to second lever 310 at a fifth pivot point 355. The functionality of link 345 is shown and discussed with respect to FIG. 4 below.

In addition, the door braking assembly includes at least one spring arranged to bias the first brake pad and the second brake pad out of engagement with the retainer arm. For example, assembly 200 includes a first spring 360 connecting mounting bracket 300 to first lever 305. First spring 360 biases second end 322 in a direction away from retainer arm 125. Therefore, first spring 360 biases first brake pad 330 out of engagement with retainer arm 125, as illustrated by a first space 365 in FIG. 3. Spring 360 may be a coil spring as shown or any suitable biasing member, such as an elongate elastic material member, etc.

Similarly, assembly 200 also includes a second spring 370 connecting mounting bracket 300 to second lever 310. Second spring 370 biases second end 332 in a direction away from retainer arm 125. Therefore, second spring 370 biases second brake pad 340 out of engagement with retainer arm 125, as illustrated by a second space 375 in FIG. 3. Like first spring 360, second spring 370, although shown as a coil spring, may take any suitable form and be made from any suitable material.

Figure 4:
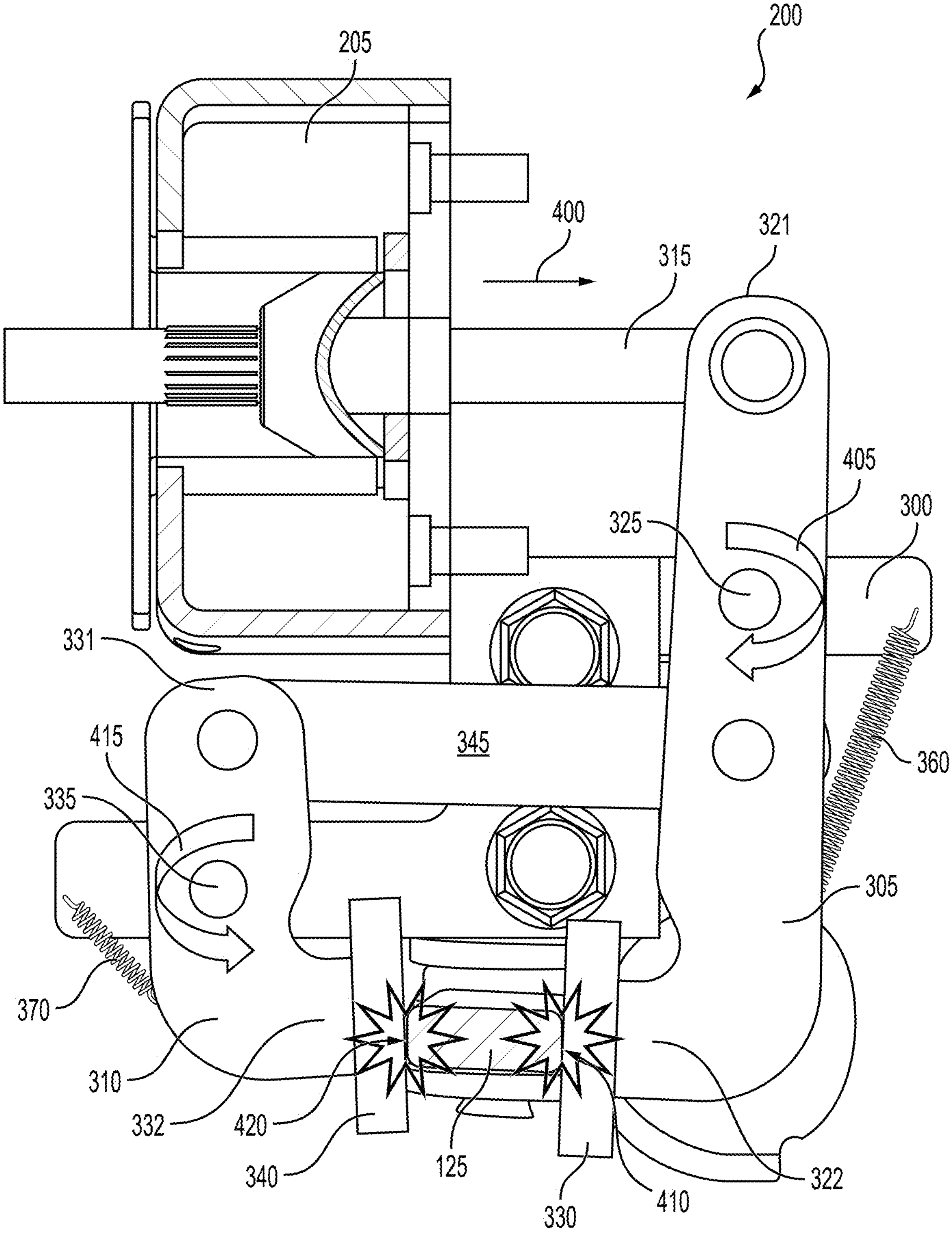
FIG. 4 is a schematic rear view of the door braking system of FIG. 3 in a closed, activated condition.

Upon actuation of the solenoid, the first lever and second lever are actuated as calipers, thereby engaging the first brake pad and the second brake pad with the door retainer arm. FIG. 4 is a schematic rear view of the door braking system of FIG. 3 in a closed, activated condition and shows the movement of components compared to their respective positions in the open, inactive condition shown in FIG. 3.

As shown in FIG. 4, when solenoid 5 is actuated, actuation rod 315 is moved in the direction of a first arrow 400, thereby moving first end 321 of first lever 305 to the right in FIG. 4. Because first lever 305 is pivotable around a central pivot point, namely second pivot point 325, as illustrated by a second arrow 405, movement of first end 321 to the right results in movement of second end 322 to the left, thereby moving first brake pad 330 into engagement with retainer arm 125, as illustrated at a first contact point 410.

As further shown in FIG. 4, due to the connection of cross member link 345 to the lower portion of first lever 305 (i.e., below second pivot point 325), cross member link 345 moves to the left when solenoid 205 is actuated. This moves first end 331 of second lever 310 to the left. Because of the connection of second lever 310 to mounting bracket 300 at a central pivot point, namely third pivot point 335, movement of first end 331 to the left, rotates second lever 310 counter-clockwise, as illustrated by a third arrow 415. This moves second end 332 of second lever 310 to the right, bringing second brake pad 340 into engagement with retainer arm 125, as illustrated at a second contact point 420.

The actuation force of solenoid 205 may be regulated to vary the amount of clamping force applied to retainer arm 125 by first brake pad 330 and second brake pad 340. The clamping force may be varied depending on the severity of the door movement. For example, the faster the door is opened, the more clamping force may be applied in order to control the door by slowing it down.

It will also be noted that any suitable materials may be selected for the brake pads. The materials and brake pad thickness may be selected based on the expected life of the vehicle and braking system. Exemplary brake pad materials may include composite materials, such as nylon, rubber, and other synthetic materials. The retainer arm may be formed of metal, and thus, the brake pads may be formed of a suitable material for binding the metal retainer arms. In other embodiments, non-metal materials may be utilized for the retainer arms and, in such case, the brake pad materials may be chosen accordingly.

Figure 5:
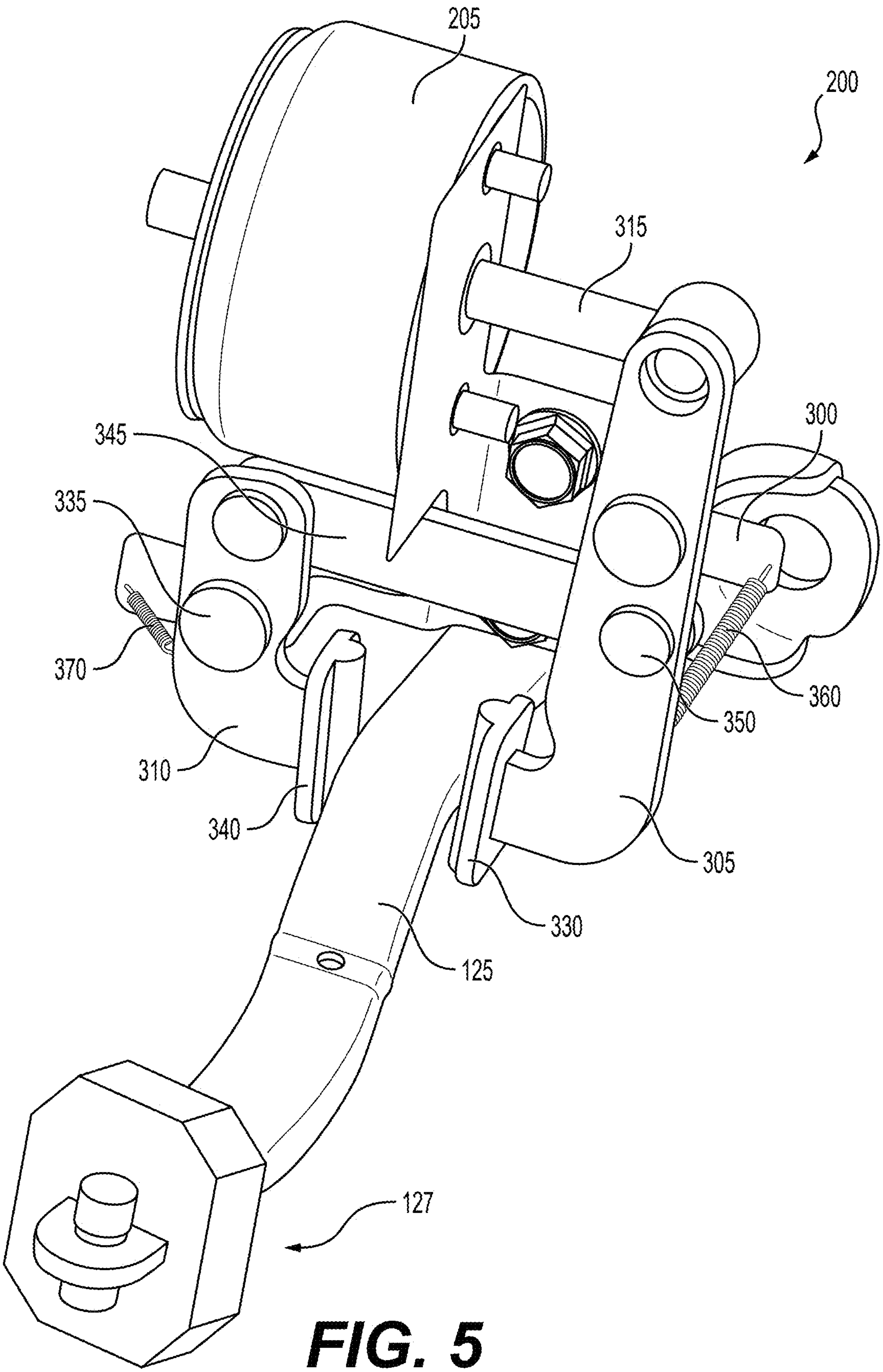
FIG. 5 is a schematic perspective rear view of the door braking system of FIG. 3 in an open, inactive condition.

FIG. 5 is a schematic perspective rear view of the door braking system of FIG. 3 in an open, inactive condition. FIG. 5 is provided to show an additional view of the various components of braking assembly 200. The contact between solenoid 205 and mounting bracket 300 is visible, since the assembly is rotated as compared to FIG. 4. FIG. 5 illustrates the assembly in an unactuated, inactive condition, where first brake pad 330 and second brake pad 340 is disengaged from retainer arm 125.

Figure 6:
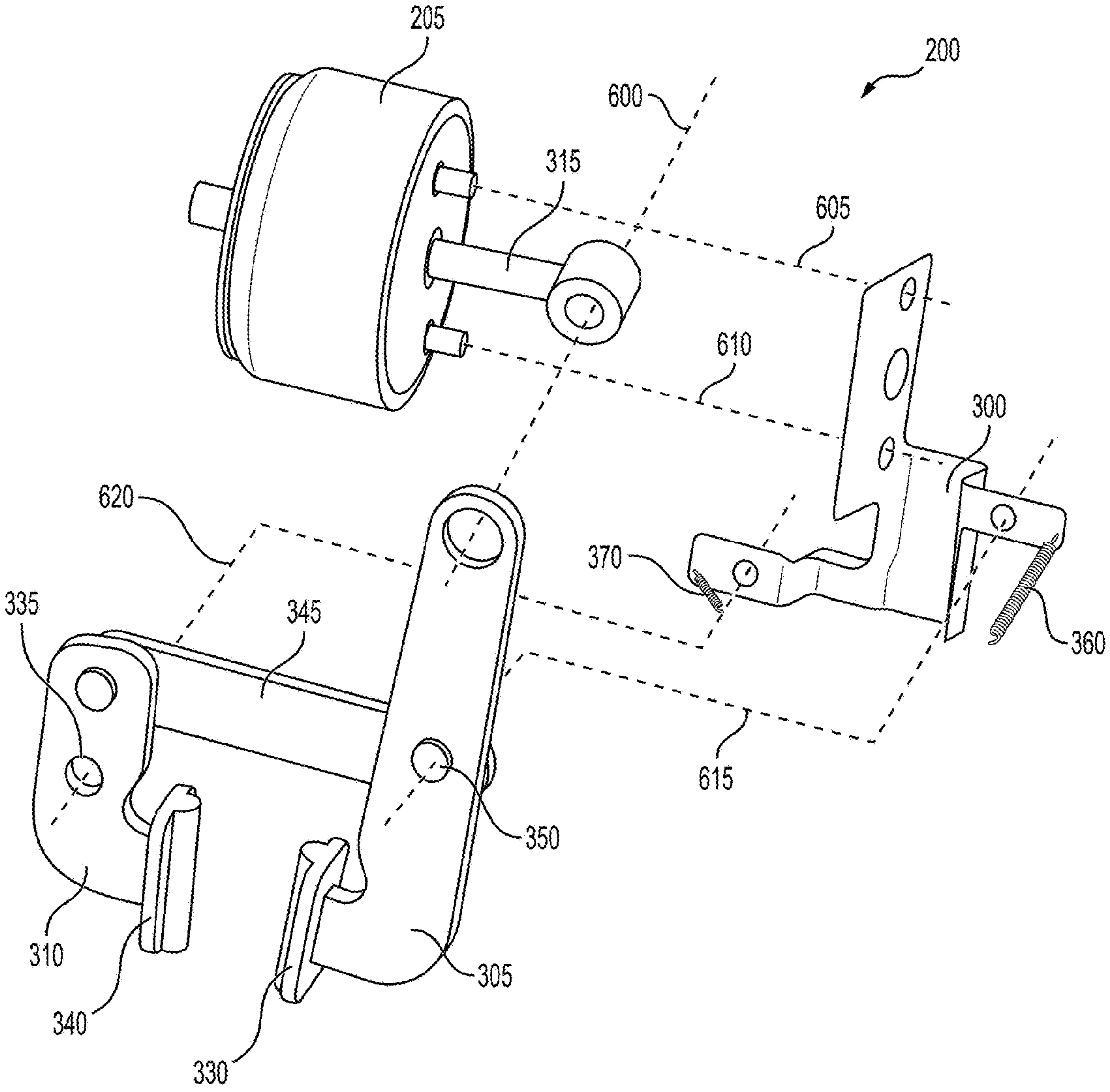
FIG. 6 is a schematic exploded view of components of the door braking system of FIG. 3.

FIG. 6 is a schematic exploded view of components of the door braking system of FIG. 3. FIG. 6 illustrates the connections/alignment between the components of braking assembly 200. As shown in FIG. 6, actuation rod 315 of solenoid 205 is aligned with first lever 305, illustrated by a first axis 600. Similarly, the fasteners connecting solenoid 205 to mounting bracket 300 are aligned according to a second axis 605 and a third axis 610. Also, fourth pivot point 350 of first lever 305 is aligned with respect to mounting bracket 300 along a fourth axis 615. And similarly, third pivot point 335 of second lever 310 is aligned with respect to mounting bracket 300 along a fifth axis 620.

Figure 7:
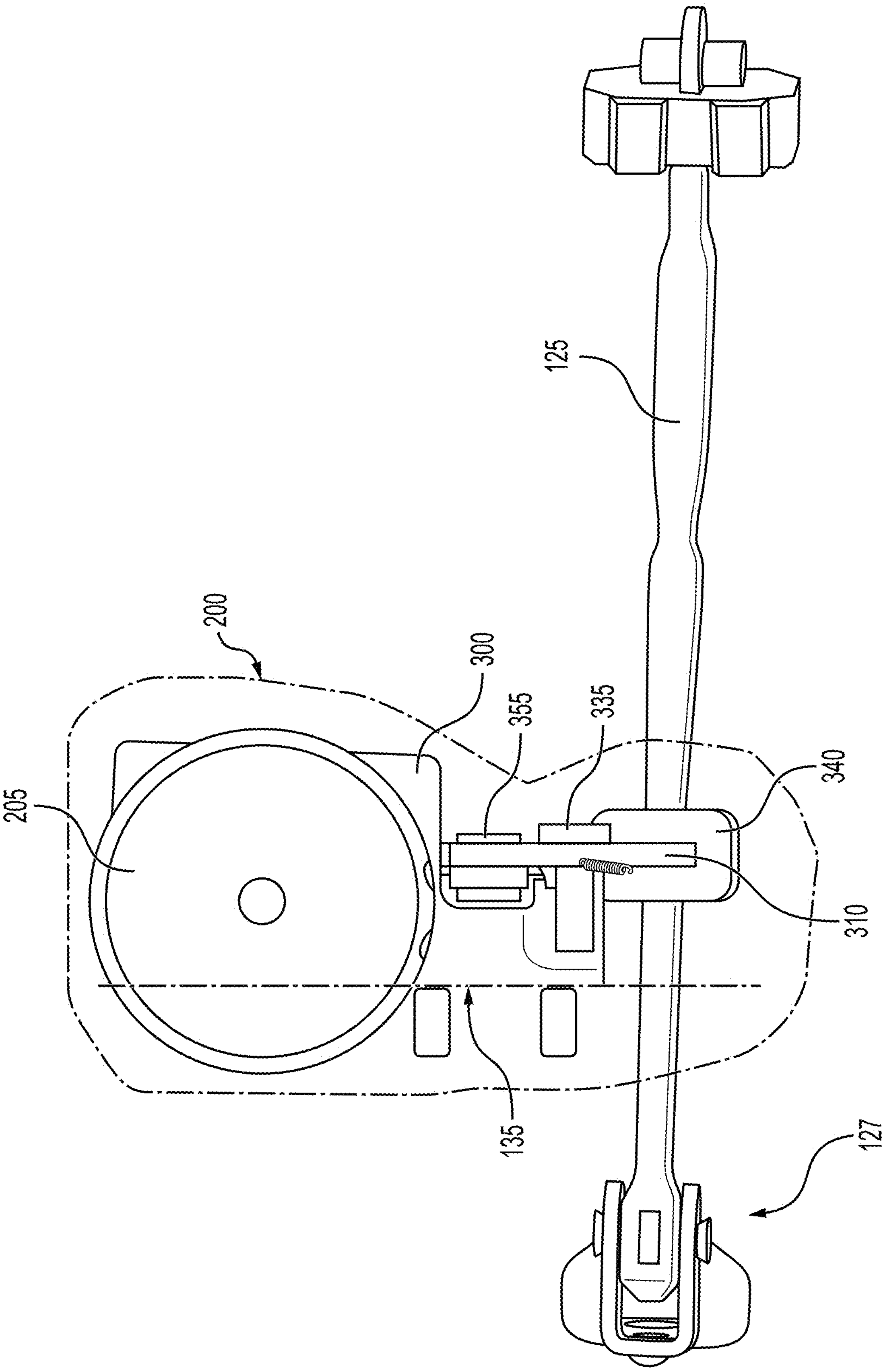
FIG. 7 is a schematic side view of the door braking system with indication of the mounting plane between the braking system and a door shell defining an inner cavity within the door.

FIG. 7 is a schematic side view of the door braking system with indication of the mounting plane between the braking system and a door shell defining an inner cavity within the door. As discussed above, braking assembly 200 is housed within the cavity of the door. This cavity is defined, at least in part by a front wall 135 of the door. That is, everything to the right of front wall 135 in FIG. 7 is housed within the door cavity.

The operation of braking assembly 200 may be automated based on one or more data sets collected. For example, door acceleration and/or velocity may be monitored and the activation of braking assembly 200 may be regulated based on this/these monitored parameter(s). If the door is determined to be opening or closing too quickly (in terms of acceleration and/or velocity), the braking assembly 200 may be activated. In addition, an object detection system may determine whether any objects are in the way of the door opening and/or closing, and the system may control the braking assembly 200 in order to avoid hitting nearby objects.

Figure 8:
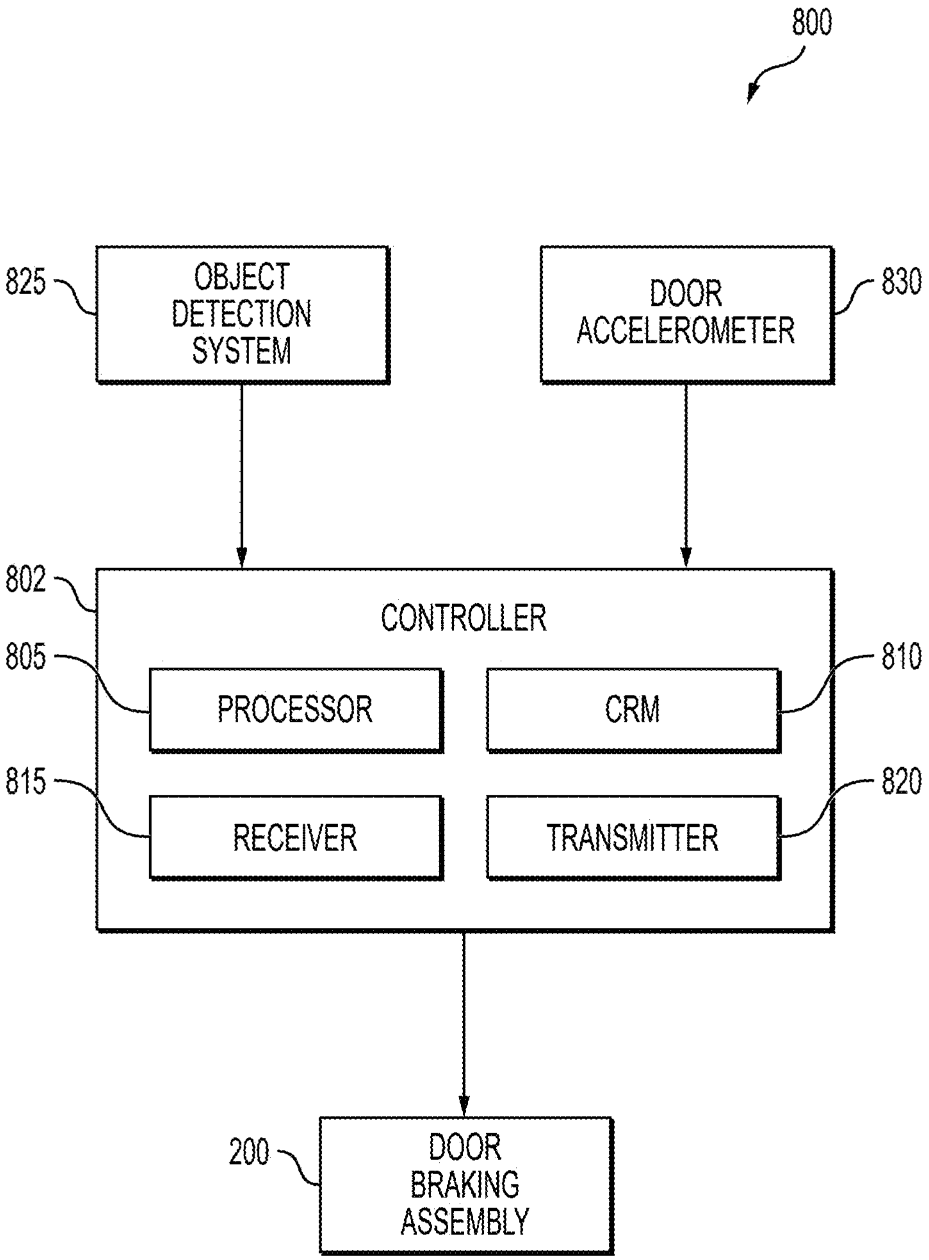
FIG. 8 is a schematic block system diagram of a braking system according to an exemplary disclosed embodiment.

FIG. 8 is a schematic block system diagram of a braking system according to an exemplary disclosed embodiment. As shown in FIG. 8, a vehicle braking system 800 may include braking assembly 200 as discussed above, as well as a controller 802, an object detection system 825 for determining whether there is an object in the way of an opening (or closing) door, and a door accelerometer 830 or other sensor(s) for detecting the acceleration and/or velocity of the door.

Controller 802 may include various computing and communications hardware, such as servers, integrated circuits, displays, etc. Further, controller 802 may include a device processor 805 and a non-transitory computer readable medium 810 including instructions executable by device processor 805 to perform the processes discussed herein. In some embodiments, one or more components of controller 802 may be incorporated into one or more computing components of a vehicle. In some embodiments, the controller may be housed within the body of the vehicle. In other embodiments, the controller may be housed within the door of the vehicle.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 802 may include networking hardware configured to interface with other nodes of a network, such as a LAN, WLAN, or other networks. In Further, controller 802 may be configured to receive data from a plurality of sources and communicate information to one or more external destinations. Accordingly, controller 802 may include a receiver 815 and a transmitter 820. (It will be appreciated that, in some embodiments, the receiver and transmitter may be combined in a transceiver.) In some cases, communications between components may be made via the Internet, a cellular network, or other suitable communications network.

Any suitable communication platforms and/or protocols may be utilized for communication between controller 802 and other components of the system. Since the various sources of information may each have their own platform and/or protocol, system 802 may be configured to interface with each platform and/or protocol to receive the data.

Computer readable medium 810 includes instructions, executable by device processor 805, for receiving data from object detection system 825 and/or from door accelerometer 830. Based on this received data, the system may activate door braking assembly 200.

Figure 9:
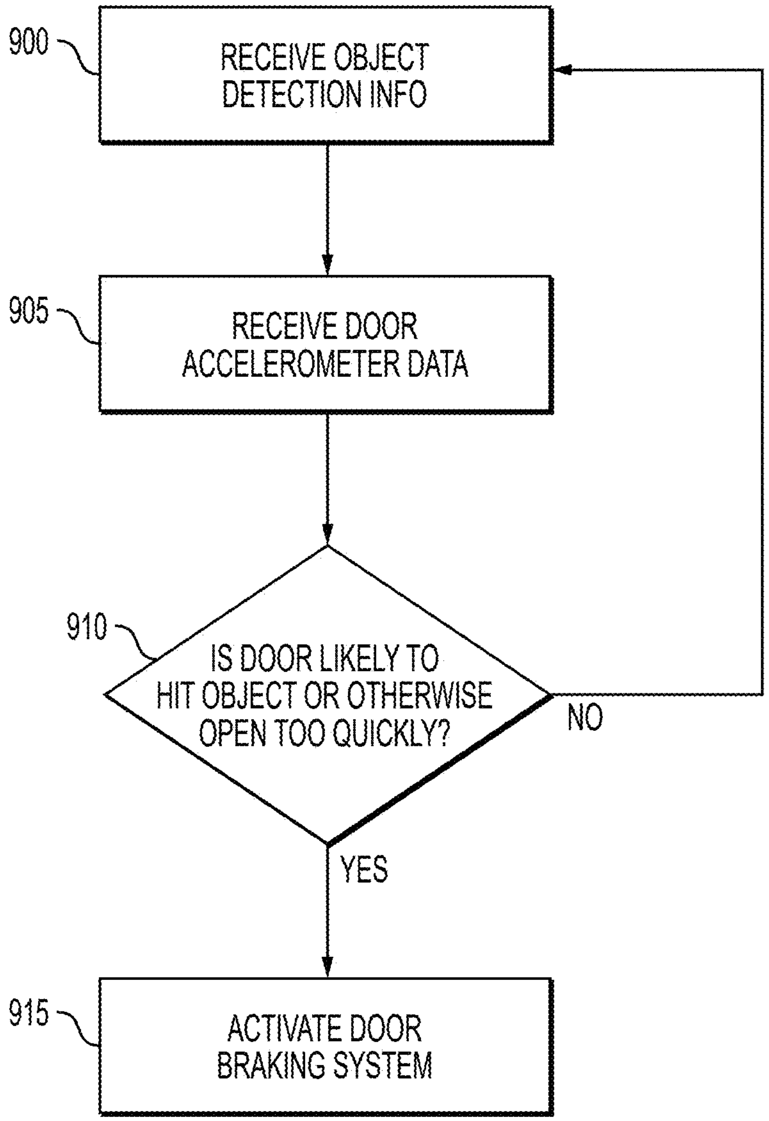
FIG. 9 is a flowchart illustrating a method of operating a braking system according to an exemplary embodiment.

FIG. 9 is a flowchart illustrating a method of operating a braking system according to an exemplary embodiment. As shown in FIG. 9, at step 900, the system receives object detection information. At step 905, the system receives door accelerometer data. It will be understood that steps 900 and 905 may occur in any order or even simultaneously.

Once the data is received regarding potential objects or excess door acceleration/velocity, the system may determine, at step 910, whether the door is likely to hit an object or if it is otherwise projected to open too quickly (e.g., if the acceleration or velocity exceeds a predetermined value. If not, the process starts over again as the logic loops back to the beginning. If so, then the braking system automatically activates the door braking system at step 915 in order to apply the braking assembly to the retainer arm to thereby control movement of the vehicle door.

The thresholds above which the braking assembly will be activated may be set to any suitable value for the door application. For example, it may be desirable to limit the acceleration/velocity of larger/heavier doors to a lower value than smaller/lighter doors. It also may vary whether the door is a front door, rear door, etc. Finally, the threshold values may vary depending on which type of vehicle the door is affixed to.

In some embodiments, for example for a passenger vehicle, the system may be configured to activate the braking system when the acceleration of the door exceeds predetermined threshold of approximately 4 $m/s^2$.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

I claim:

1. A braking system for a vehicle door, comprising:
- a first lever having a first end, a second end, and a central pivot point between the first end and the second end;
- wherein the second end of the first lever includes a first brake pad configured to engage with a retainer arm associated with the vehicle door;
- a second lever having a first end, a second end, and a central pivot point;
- wherein the second end of the second lever includes a second brake pad configured to engage with the retainer arm;
- a linkage between the first lever and the second lever such that movement of the first lever also moves the second lever; and
- an actuation device configured to move the first end of the first lever in a first direction to thereby move the first brake pad and the second brake pad into engagement with the retainer arm.

2. The braking system of claim 1, further including at least one spring arranged to bias the first brake pad and the second brake pad out of engagement with the retainer arm.

3. The braking system of claim 2, wherein the at least one spring includes a first spring attached to a mounting bracket and the first lever and configured to bias the second end of the first lever in a direction away from the retainer arm.

4. The braking system of claim 3, wherein the at least one spring further includes a second spring attached to the mounting bracket and the second lever and configured to bias the second end of the second lever in a direction away from the retainer arm.

5. The braking system of claim 1, wherein the actuation device is a solenoid.

6. The braking system of claim 5, further including a solenoid actuation rod pivotally attached to the first end of the first lever.

7. A vehicle including a braking system for a door of the vehicle, comprising:
- a vehicle body; and
- at least one door opening associated with the vehicle door; and
- a door braking system including:
- a retainer arm connecting the vehicle door with the vehicle body;
- a first lever including a first brake pad configured to engage with the retainer arm;

a second lever including a second brake pad configured to engage with the retainer arm;

a linkage between the first lever and the second lever such that movement of the first lever also moves the second lever; and an actuation device configured to actuate the first lever to thereby move the first brake pad and the second brake pad into engagement with the retainer arm.

8. The vehicle of claim 7, further including at least one spring arranged to bias the first brake pad and the second brake pad out of engagement with the retainer arm.

9. The vehicle of claim 8, wherein the at least one spring includes a first spring attached to a mounting bracket and the first lever and configured to bias the second end of the first lever in a direction away from the retainer arm.

10. The vehicle of claim 9, wherein the at least one spring further includes a second spring attached to the mounting bracket and the second lever and configured to bias the second end of the second lever in a direction away from the retainer arm.

11. The vehicle of claim 7, wherein the actuation device is a solenoid.

12. The vehicle of claim 11, further including a solenoid actuation rod pivotally attached to an end of the first lever opposite the first brake pad.

13. The vehicle of claim 7, wherein the door braking system is installed inside a cavity within the vehicle door.

14. A braking system for a door of a vehicle, the system comprising:

a first lever including a first brake pad configured to engage with a retainer arm associated with the vehicle door;

a second lever including a second brake pad configured to engage with the retainer arm;

a linkage between the first lever and the second lever such that movement of the first lever also moves the second lever;

an actuation device configured to actuate the first lever to thereby move the first brake pad and the second brake pad into engagement with the retainer arm; and a controller including a device processor and a non-transitory computer readable medium having instructions stored thereon and executable by the processor to perform the following steps:

receiving data, via a door accelerometer, regarding movement of the vehicle door;

determining, based on the received data whether the acceleration or velocity of the vehicle door exceeds a predetermined value; and activating the actuation device in order to apply the braking system to the retainer arm to thereby control movement of the vehicle door.

15. The braking system of claim 14, wherein the data received regarding movement of the vehicle door includes door acceleration data.

16. The braking system of claim 15, wherein the system is configured to activate the braking system when the acceleration of the door exceeds the predetermined value of approximately 4 $m/s^2$.

17. The braking system of claim 14, wherein the data received regarding movement of the vehicle door includes door velocity data.

18. The braking system of claim 14, further including at least one spring arranged to bias the first brake pad and the second brake pad out of engagement with the retainer arm.

* * * * *